(12) United States Patent
Ayadurai et al.

(10) Patent No.: US 9,681,478 B2
(45) Date of Patent: *Jun. 13, 2017

(54) SHORT RANGE COMMUNICATION IN A WIRELESS COMMUNICATIONS SYSTEM

(71) Applicant: Telefonaktiebolaget LM Ericsson (publ), Stockholm (SE)

(72) Inventors: Vicknesan Ayadurai, Sollentuna (SE); Mikael Prytz, Rönninge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/171,117

(22) Filed: Jun. 2, 2016

(65) Prior Publication Data

US 2016/0277915 A1    Sep. 22, 2016

Related U.S. Application Data

(63) Continuation of application No. 14/431,967, filed as application No. PCT/SE2012/051041 on Sep. 28, 2012.

(51) Int. Cl.
| | |
|---|---|
| *H04W 8/00* | (2009.01) |
| *H04W 4/02* | (2009.01) |
| *H04W 76/02* | (2009.01) |
| *H04W 76/04* | (2009.01) |
| *H04L 29/06* | (2006.01) |
| *H04W 72/08* | (2009.01) |
| *H04W 84/18* | (2009.01) |
| *H04W 88/06* | (2009.01) |

(52) U.S. Cl.
CPC ....... *H04W 76/023* (2013.01); *H04L 63/0428* (2013.01); *H04L 63/061* (2013.01); *H04W 4/023* (2013.01); *H04W 8/005* (2013.01); *H04W 72/085* (2013.01); *H04W 76/043* (2013.01); *H04W 84/18* (2013.01); *H04W 88/06* (2013.01)

(58) Field of Classification Search
None
See application file for complete search history.

(56) References Cited

U.S. PATENT DOCUMENTS

| | | |
|---|---|---|
| 2005/0059345 A1 | 3/2005 | Palin et al. |
| 2006/0073788 A1 | 4/2006 | Halkka et al. |
| 2008/0171561 A1 | 7/2008 | Irony et al. |

(Continued)

FOREIGN PATENT DOCUMENTS

| | | |
|---|---|---|
| EP | 2472987 A2 | 7/2012 |
| EP | 2480039 A2 | 7/2012 |

(Continued)

*Primary Examiner* — Kimberly A Williams
(74) *Attorney, Agent, or Firm* — Murphy, Bilak & Homiller, PLLC (57) ABSTRACT

There are provided mechanisms for wireless devices to initiate direct-mode or device-to-device communications by exploiting the availability of the existing network coverage. Short range communications in a wireless communications system between a first wireless device and a second wireless device involves exchanging messages between the first wireless device and the second wireless device, first on a first communications link via a network node and then on a second communications link. A corresponding method is provided.

27 Claims, 5 Drawing Sheets

(56) References Cited

U.S. PATENT DOCUMENTS

| | | |
|---|---|---|
| 2010/0165882 A1 | 7/2010 | Palanki et al. |
| 2010/0291952 A1 | 11/2010 | Gosset et al. |
| 2012/0140651 A1 | 6/2012 | Nicoara et al. |
| 2012/0184328 A1 | 7/2012 | Komaki et al. |
| 2013/0034082 A1 | 2/2013 | Etemad et al. |
| 2013/0195026 A1 | 8/2013 | Johnsson et al. |
| 2013/0286862 A1 | 10/2013 | Sartori et al. |
| 2013/0297810 A1 | 11/2013 | Ho et al. |
| 2013/0303171 A1 | 11/2013 | Jang et al. |
| 2014/0036793 A1 | 2/2014 | Johnsson et al. |
| 2014/0073254 A1 | 3/2014 | Ichihara et al. |
| 2014/0086152 A1 | 3/2014 | Bontu et al. |
| 2014/0105178 A1 | 4/2014 | Jang et al. |
| 2014/0219095 A1 | 8/2014 | Lim et al. |
| 2015/0009915 A1 | 1/2015 | Baek et al. |
| 2015/0043429 A1 | 2/2015 | Kim et al. |
| 2015/0245191 A1* | 8/2015 | Xu .................... H04W 76/023 370/338 |
| 2015/0257166 A1* | 9/2015 | Weizman ............ H04W 40/12 455/452.2 |
| 2016/0150426 A1* | 5/2016 | Panaitopol ........... H04W 24/08 370/252 |

FOREIGN PATENT DOCUMENTS

| | | |
|---|---|---|
| JP | 2003333655 A | 11/2003 |
| JP | 2009124758 A | 6/2009 |
| JP | 2012510206 A | 4/2012 |
| WO | 2010102668 A1 | 9/2010 |
| WO | 2011147468 A1 | 12/2011 |
| WO | 2012102546 A2 | 8/2012 |

\* cited by examiner

◀ ══ ══ ══ = Transmission over WLAN, bypassing network node

SHORT RANGE COMMUNICATION IN A WIRELESS COMMUNICATIONS SYSTEM

TECHNICAL FIELD

Embodiments presented herein relate to short range communications in a wireless communications system, and particularly to setting up a short range connection between a first wireless device and a second wireless device in the wireless communications system

BACKGROUND

In wireless communications networks, there is always a challenge to obtain good performance and capacity for a given communications protocol, its parameters and the physical environment in which the wireless communications network is deployed.

A cellular network, or mobile network, is generally defined as a radio network distributed over land areas called cells, each served by at least one fixed-location transceiver device, i.e., central control node, known as a cell site or base station (BS), hereinafter commonly referred to as network nodes. In turn the central control node is connected to a wired core network.

In a traditional cellular, or mobile, system, communications from/to portable transceiver devices (hereinafter denoted as wireless devices) takes place via the central control node. Thus, regardless of the final destination of an information message transmitted by a wireless device, the information message is always transmitted first to the wired core network via the central control node, where the information message is examined, e.g., for addressing, routing and/or scheduling purposes, and then forwarded onward accordingly until it reaches its final destination device.

This approach has been sufficiently adequate up to now when traffic has travelled mainly "inter-cell", i.e., between different cells, or even "inter-network" e.g., between the cellular, or mobile, network and other networks, such as a wired landline network. In such cases, it is necessary for traffic to be transported to the destination cell or landline network via the central control node.

However, "intra-cell" traffic, i.e., traffic within a cell, will also be directed to the central control node, only to be forwarded back to a wireless device within the same cell, potentially in close proximity to the original transmitting wireless device.

Hence, there is still a need for improved short range communications between wireless devices in a wireless communications system.

SUMMARY

An object of embodiments herein is to provide improved short range communications between wireless devices in a wireless communications system.

The inventors of the enclosed embodiments have through a combination of practical experimentation and theoretical derivation discovered that two wireless devices in close proximity may potentially communicate with each other over one or more alternative wireless technologies, such as WLAN, Bluetooth or IR, and thereby harvest benefits of the direct link, such as shorter distances (single hop count instead of two), lower power transmissions (since the devices are in closer proximity) and/or higher overall bitrates. One issue, however, is how to efficiently establish such a communications link.

The embodiments presented herein disclose mechanisms for wireless devices to initiate direct-mode or device-to-device communications by exploiting the availability of the existing network coverage. Based on the communications conditions between them, the wireless devices could potentially communicate more efficiently directly using alternative technologies instead of the cellular link via the central control node. A particular object is therefore to utilize an existing cellular communications link for evaluating conditions for setting up a short range connection between a first wireless device and a second wireless device on an alternative communications link.

According to a first aspect there is presented a method for short range communications in a wireless communications system between a first wireless device and a second wireless device. The method is performed in the first wireless device. The method comprises exchanging a first set of messages with the second wireless device via a network node in the wireless communications system for establishing a first communications link with the second wireless device via the network node. The method comprises exchanging a second set of messages with the second wireless device via the network node for evaluating conditions for setting up a short range connection between the first wireless device and the second wireless device on a second communications link. The method comprises exchanging a third set of messages with the second wireless device on the second communications link for establishing the short range connection with the second wireless device based on at least one of the conditions.

Advantageously this provides an efficient means for a wireless device to decide on whether to operate in a short range communications mode for communications with a peer wireless device. Advantageously this allows existing network infrastructure and communications protocols to be used for evaluating and setting up the short range communications link.

According to a second aspect there is presented a computer program for short range communications in a wireless communications system between a first wireless device and a second wireless device. The computer program comprises computer program code which, when run on the first wireless device, causes the first wireless device to perform a method according to the first aspect.

According to a third aspect there is presented a computer program product. The computer program product comprises a computer program according to the second aspect and a non-volatile computer readable means on which the computer program is stored.

According to a fourth aspect there is presented a first wireless device for short range communications in a wireless communications system between the first wireless device and a second wireless device. The first wireless device comprises a first communications interface arranged to exchange a first set of messages with the second wireless device via a network node in the wireless communications system for establishing a first communications link with the second wireless device via the network node. The first communications interface is further arranged to exchange a second set of messages with the second wireless device via the network node for evaluating conditions for setting up a short range connection between the first wireless device and the second wireless device on a second communications link. The first wireless device comprises a second communications interface arranged to exchange a third set of messages with the second wireless device on the second communications link for establishing the short range connection with the second wireless device based on at least one of the conditions.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
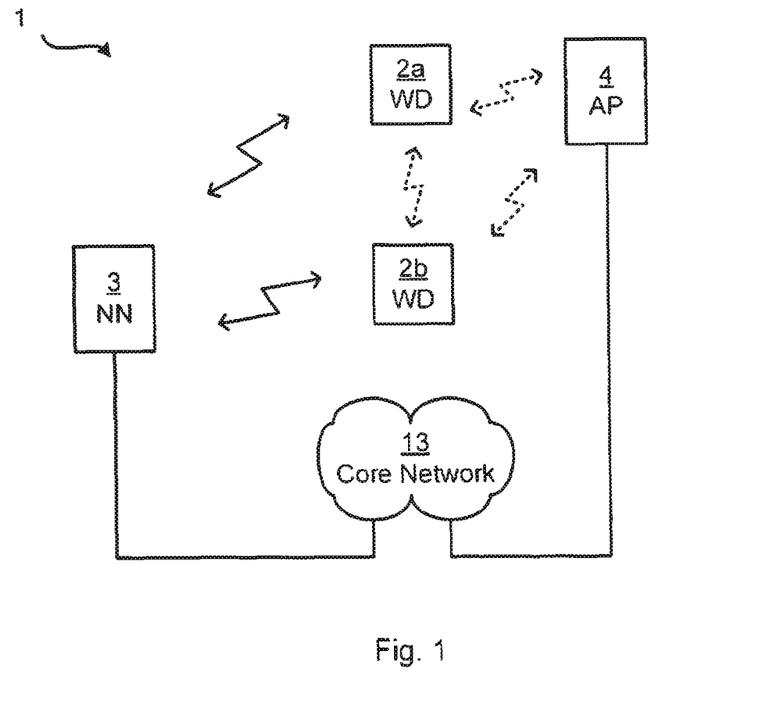
FIG. 1 is a schematic diagram illustrating a wireless communications network where embodiments presented herein may be applied.

FIG. 1 is a schematic diagram illustrating a wireless communications system 1 where embodiments presented herein can be applied. The wireless communications system 1 comprises a network node 3. In the wireless communications system 1 one or more wireless devices (WD) 2a, 2b are arranged to be operatively connected to the network node 3. Each WD 2a, 2b may be one of a user equipment (UE), a mobile terminal, a user terminal, a user agent, a mobile phone, etc. The wireless communications system 1 further comprises a wireless access point. (WAP) 4. In general terms a wireless access point is a device that allows wireless devices 2a, 2b, to connect to a network using Wi-Fi, Bluetooth, etc. The wireless communications system 1 further comprises a core network 13 operatively coupled to the network node 3 and the access point 4. As is understood, the wireless communications system 1 may generally comprise a plurality of network nodes 3 and a plurality of WDs 2a, 2b and a plurality of WAPs 4.

The wireless communications system 1 may generally comply with any one or a combination of W-CDMA (Wideband Code Division Multiple Access), LTE (Long Term Evolution), EDGE (Enhanced Data Rates for GSM Evolution, Enhanced GPRS (General Packet Radio Service)), CDMA2000 (Code Division Multiple Access 2000), etc., as long as the principles described hereinafter are applicable. According to embodiments the wireless communications system 1 is compliant with the E-UTRA (UMTS Terrestrial Radio Access Network) network. E-UTRAN or EUTRAN is the air interface of the LTE. Typically the E-UTRA network consists only of network nodes 3 in the form of eNodeBs (E-UTRAN NodeB, also known as Evolved NodeB) on the network side. The network node 3 may according to embodiments alternatively be a traditional NodeB which typically has minimum functionality, and is controlled by an RNC (Radio Network Controller). NodeB is a term used in UMTS (Universal Mobile Telecommunications System) equivalent to the BTS (base transceiver station) description used in the Global System for Mobile Communications (GSM). It is the hardware that is connected to the core network 13 that communicates directly with WD 2a, 2b. The eNodeB performs tasks similar to those performed together by the NodeBs and the RNC in UTRA. eNodeBs are typically connected to each other via the so-called X2 interface, and they connect to the packet switched (PS) core network 13 via the so-called S1 interface.

The embodiments disclosed herein relate to short range communications in a wireless communications system 1 between the first WD 2a and the second WD 2b. In more detail, the enclosed embodiments are based on the understanding that in "intra-cell" scenarios direct, or so-called device-to-device, communications could be an efficient means for two devices to communicate. Furthermore, portable transceiver devices may be equipped with multiple wireless interfaces. Apart from the regular cellular radio-access technologies (RATs) such as GSM, WCDMA, and LTE, which operate on licensed spectrum, the portable transceiver devices may also usually be equipped with alternative communications interfaces, such as Bluetooth based, wireless LAN (WLAN) based, infrared based communications interfaces, and/or a near field communications (NFC) interface, which do not operate on licensed spectrum. That is, two wireless devices which wish to communicate with each other would like to do so directly, instead of via the network node and the wired-network.

In order to obtain short range communications on an alternative (non-cellular) communications link there is provided a wireless device, a method performed in the wireless device, and a computer program comprising code, for example in the form of a computer program product, that when run on the wireless device, causes the wireless device to perform the method.

Figure 2:
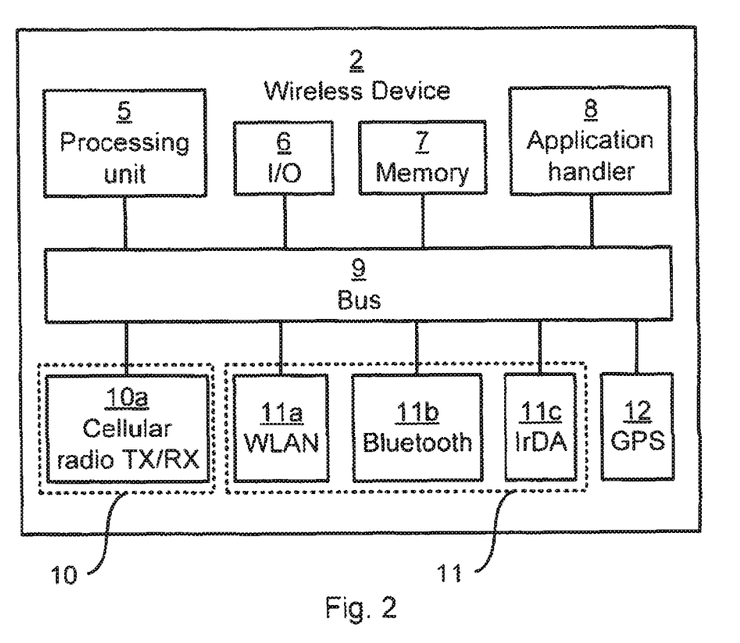
FIG. 2 is a schematic diagram showing functional modules of a wireless device.

FIG. 2 schematically illustrates, in terms of a number of functional modules, the components of a wireless device 2. A processing unit 5 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 14 (as in FIG. 3), e.g. in the form of a memory 7. Thus the processing unit 5 is thereby arranged to execute methods as herein disclosed. The memory 7 may also comprise persistent storage, which, for example, can be any single one or combination of magnetic memory, optical memory, solid state memory or even remotely mounted memory. The wireless device 2 may further comprise an input/output (I/O) interface 6 for receiving and providing information to a user interface. The wireless device 5 also comprises a first communications interface 10 and a second communications interface 11. The first communications interface 10 comprises one or more transmitters (TX) and receivers (RX) collectively denoted by reference numeral 10a, comprising analogue and digital components and a suitable number of antennae for radio communication with the network node 3. The second communications interface 11 comprises at least one of a WLAN interface 11a, a Bluetooth interface 11b, and an infrared interface 11c. The wireless device 2 may further comprise a global positioning system (GPS) unit 12. The wireless device 2 may further comprise an application handler 8 for handling an application run on the wireless device 2. The processing unit 5 controls the general operation of the wireless device 2, e.g. by transmitting and receiving control signals on a bus 9 to the I/O 6, the memory 7, the application handler 8, the first communications interface 10, the second communications interface 11 and the GPS unit 12.

The processing unit 5 may be arranged to run a set of computer program instructions forming an interconnection module. The interconnection module may be associated with the lower half of the communications protocol stack (for example as defined by the open systems interconnections, OSI, model) of the wireless device 2. Thereby the interconnection module may enable injection and interception of messages associated with setting up a short range connection as well as re-routing of user data packets to and from the applications. The interconnection module may also be arranged to communicate with the second communications interface 11, so as to enable, disable, read and/or write data and status values to and from the components of the second communications interface 11. For example when the wireless device 2 by means of the first communications interface 10 communicates on the first communications link the interconnection module may transparently forward packets between the application handler 8 and the first communications interface 10. However, once the wireless device 2 has been activated for inter alia WLAN, Bluetooth or IrDA transmission, data packets may be forwarded between the application handler 8 and the second communications interface 11 by the interconnection module.

Other components, as well as the related functionality, of the wireless device 2 are omitted in order not to obscure the concepts presented herein.

Figure 3:
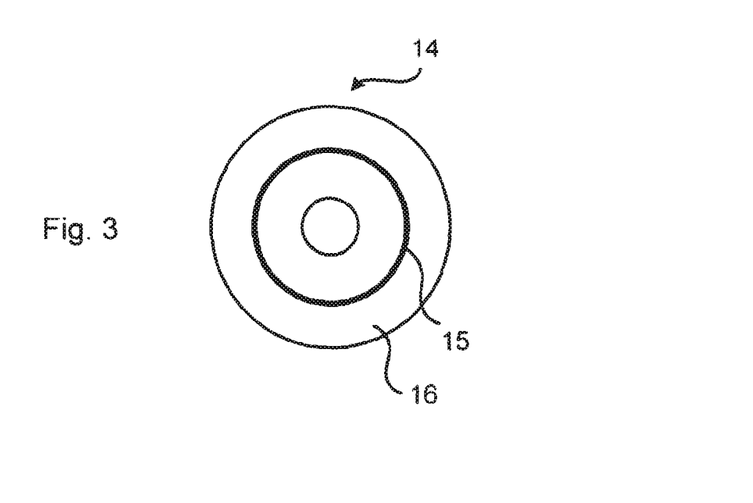
FIG. 3 shows one example of a computer program product comprising computer readable means.
Figure 4:
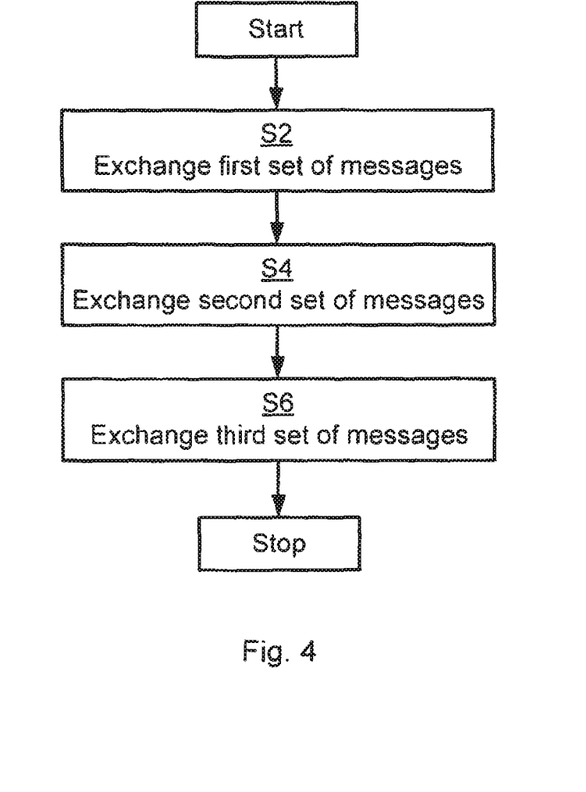
FIGS. 4 and 5 are flowcharts of methods according to embodiments.
Figure 5:
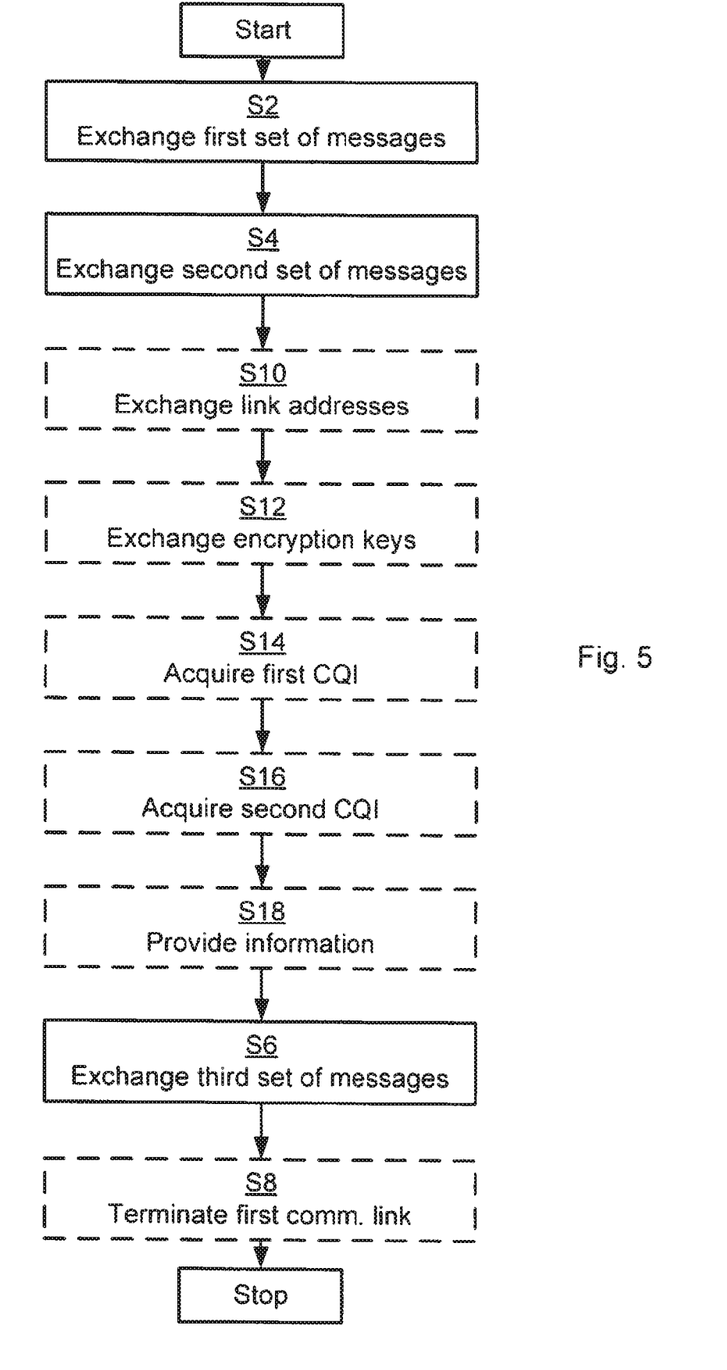

FIGS. 4 and 5 are flow charts illustrating embodiments of methods for short range communications in a wireless communications system 1 between a first WD 2a and a second WD 2b. The methods are performed in the first WD 2a. Alternatively, at least some steps of the methods may be performed in the second WD 2b. The methods are advantageously provided as computer programs 15. FIG. 3 shows one example of a computer program product 14 comprising computer readable means 16. On this computer readable means 16, a computer program 15 can be stored, which computer program 15 can cause the processing unit 5 and thereto operatively coupled entities and devices, such as the I/O interface 6, the memory 7, the application handler 8, the first communications interface 10, the second communications interface 11 and the GPS unit 12 to execute methods according to embodiments described herein. In the example of FIG. 3, the computer program product 14 is illustrated as an optical disc, such as a CD (compact disc) or a DVD (digital versatile disc) or a Blu-Ray disc. The computer program product could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory a flash memory, or a secure digital (SD) memory card. Thus, while the computer program 15 is here schematically shown as a track on the depicted optical disk, the computer program 15 can be stored in any way which is suitable for the computer program product 15.

The flowchart of FIG. 4 illustrates a method for short range communications in a wireless communications system 1 between a first wireless device 2a and a second wireless device 2b according to an embodiment. The method according to the flowchart of FIG. 4 is performed in the first WD 2a. However, as will be disclosed below, at least some parts of the method may be performed in the second WD 2b.

The first communications interface 10 of the first WD 2a is arranged to, in a step S2, exchange a first set of messages with the second WD 2b via a network node 3 in the wireless communications system 1. The first set of messages is exchanged for establishing a first communications link with the second WD 2b via the network node 3. Upon completion of step S2 a first communications link has thus been established between the first WD 2a and the second WD 2b, thereby enabling WD 2a and WD 2b to exchange data via the network node 3.

The first communications interface 10 of the first WD 2a is arranged to, in a step S4, exchange a second set of messages with the second WD 2b via the network node 3. The second set of messages is exchanged for evaluating conditions for setting up a short range connection between the first WD 2a and the second WD 2b on a second communications link. By exchanging the second set of messages the first WD 2a (and/or the second WD 2b) may evaluate (in the processing unit 5) whether or not it is possible to set up a short range connection between the first WD 2a and the second WD 2b.

Upon completion of step S4 (i.e. when the conditions for setting up the short range connection have been evaluated) the first WD 2a and the second WD 2b thus initiate communications interfaces so that messages can be exchanged on the second communications link. Thus, a second communications interface 11 of the first WD 2a is arranged to, in a step S6, exchange a third set of messages with the second WD 2b on the second communications link. By exchanging the third set of messages on the second communications link the first WD 2a is able to, based on at least one of the conditions, set up the short range connection with the second WD 2b. Upon completion of step S6 the second communications link has thus been established between the first WD 2a and the second WD 2b, thereby enabling WD 2a and WD 2b to exchange data via a short range connection.

The process to switch over from the first communications link to the second communications link may thus generally involve messages to be exchanged in a three-phase operation; in a first phase the type of second communications link is determined and a second communications link of the determined type is set up; in a second phase the communications channel of the set up second communications link is estimated; and in a third phase (at least part of) the data payload traffic between the first WD 2a and the second WD 2b is switched over to the second communications link. The three phases will be disclosed in more detail below with references to the sequence diagrams of FIGS. 6, 7 and 8, respectively as well as the flowchart of FIG. 5.

As noted above, according to an embodiment the wireless device 2 (and hence also the first WD 2a and the second WD 2b) comprises an interconnection module. Thus, on the transmitting side, the interconnection module may generate its own messages which are then interleaved with the outgoing data stream on the transmit data path. Likewise, on the receiver side, incoming packets may first be inspected by the interconnection module before being forwarded to the application handler 8. This makes it possible to extract messages interleaved within the received data stream. Interconnection module messages, illustrated by double-lined boxes in the sequence diagrams of FIGS. 6, 7 and 8, may thus be generated and/or terminated at the interconnection module, and may hence never reach the application handler 8. When transmitted over the first communications link, the messages associated with the interconnection module may appear as regular data traffic to the network node 3. According to an alternative embodiment the wireless device 2 (and hence also the first WD 2a and the second WD 2b) is arranged to handle the message exchanges relating to establishing the short range communications without a dedicated interconnection module. The messages illustrated by double-lined boxes in the sequence diagrams of FIGS. 6, 7 and 8, may in general be generated by the processing unit 5.

Returning now to FIG. 1, assume without losing generality that the first WD 2a intends to transfer data to the second WD 2b. It is also assumed that, at least initially, neither wireless device 2a, 2b is aware of the location of the other wireless device 2a, 2b. Typically, the first WD 2a and the second WD 2b would communicate on a data path via the network node 3 as indicated by the solid arrows representing a first communications link. According to embodiments the first communications link is a cellular, or mobile, radio link. Examples of cellular, or mobile, radio links include, but are not limited to, a global system for mobile communications, GSM, compliant link, a universal terrestrial radio access network, UTRAN, compliant link, and an evolved universal mobile telecommunications system terrestrial radio access network, E-UTRAN, compliant link. Further examples include a WiMAX compliant link, a CDMA2000 compliant link, an NMT compliant link, and an AMPS compliant link.

Figure 6:
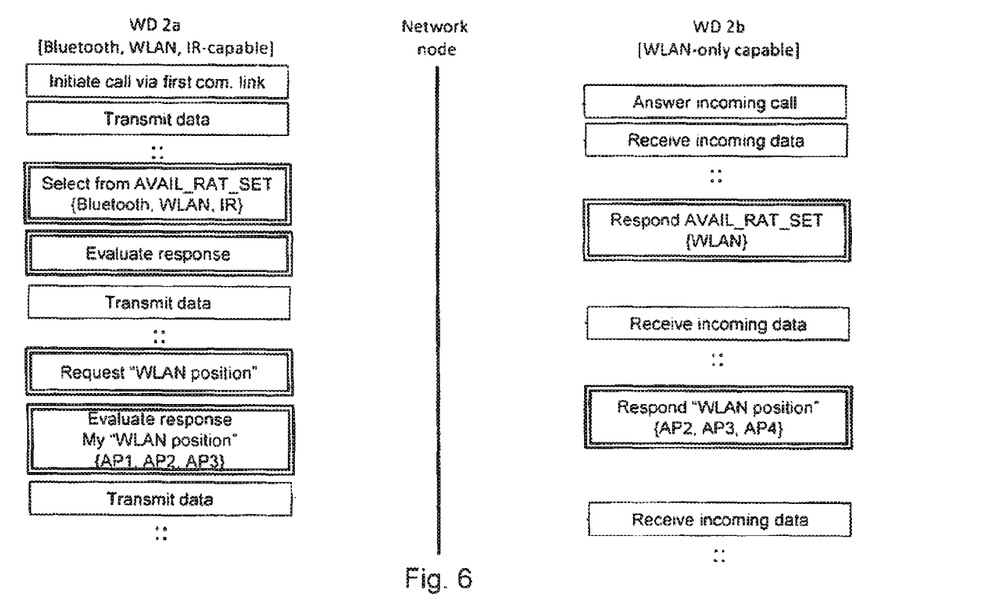
FIGS. 6, 7 and 8 are sequence diagrams according to embodiments.

As noted above, in a step S2 a first set of messages is exchanged between the first WD 2a and the second WD 2b via the network node 3 in the wireless communications system 1. The first set of messages is exchanged for establishing the first communications link between the first WD 2a and the second WD 2b via the network node 3. In FIG. 6 this is illustrated by the first WD 2a initiating a connection via the first communications link followed by transmission of data and the second WD 2b answering the incoming connection followed by reception of the data transmitted by the first WD 2a. The first set of messages is exchanged through the first communications interface 10 of the wireless devices 2a, 2b.

However, since the first WD 2a and the second WD 2b may be located closely in geographical sense, e.g., in adjacent rooms of a building, a direct, single-hop wireless path may exist via one or more alternative wireless technologies, as indicted by the dotted arrows in FIG. 1 representing at least one second communications link.

According to embodiments the second communications link is a short range communications link. For example, the second communications link may be a Wireless Local Area Network, WLAN, link, a Bluetooth link, and an Infrared Data Association, IrDA, based communications link. Further examples include a near-fields communications (NFC) compliant link. The second communications link could provide a better option according to some criteria. Such different criteria will be further disclosed below.

In order for the first WD 2a and the second WD 2b to be able to establish the second communications link a number of parameters may be exchanged, such as which type of second communications link to establish (for example by exchange of wireless capabilities), and if it is even possible to set up the second communications link (for example by exchange of positional information). Further information exchange between the first WD 2a and the second WD 2b may therefore take place.

Different alternative wireless technologies have differing range and capabilities. For example, the first WD 2a and the second WD 2b may determine their proximity to each other, and subsequently determine which type of second communications link to use. As noted above, in a step S4 a second set of messages is therefore exchanged with the second WD 2b via the network node 3. The second set of messages is exchanged for evaluating conditions for setting up a short range connection between the first WD 2a and the second WD 2b on the second communications link. The second set of messages is exchanged through the first communications interface 10 of the wireless devices 2a, 2b. According to one embodiment the evaluation is performed by the first WD 2a which in turn may initiate setting up the short range connection. According to an alternative embodiment the evaluation is performed by the second WD 2b which in turn may initiate setting up the short range connection. That is, in general terms the evaluation may be performed either by be first WD 2a or the second WD 2b, regardless of which one of the first WD 2a and the second WD 2b that initiated the exchange of the first set of messages in step S2. According to yet another embodiment, the first WD 2a may initiate setting up the short range connection although the second WD 2b performed the evaluation, and vice versa.

According to one embodiment, one of the conditions relates to a geographical relation between the first WD 2a and the second WD 2b.

The first WD 2a and the second WD 2b may also exchange their alternative wireless transmission capabilities over the first communications link. However, according to embodiments the alternative wireless transmission capabilities are only exchanged if the geographical distance (as determined from the geographical relation) is within a predetermined distance. The wireless transmission capabilities may comprise at least one of wireless local area network, WLAN, transmission, Bluetooth transmission, infrared data association, IrDA, based transmission, and NFC based transmission. According to one embodiment the predetermined distance is dependent on the available alternative transmission capabilities. For example, WLAN transmission may allow for a longer range than Bluetooth transmission; Bluetooth transmission may allow for a longer range than IrDA transmission; and IrDA transmission may allow for a longer range than NFC transmission. Thus the embodiment of relating one of the conditions to a geographical relation between the first WD 2a and the second WD 2b may be readily combined with the different available wireless transmission capabilities of the first WD 2a and the second WD 2b.

According to the illustrative example of FIG. 6 illustrating the first phase the first WD 2a is capable of establishing a second communications link based on {Bluetooth, WLAN and IR} whilst the second WD 2b is only capable of WLAN as an alternative transmission link. In FIG. 6 this is illustrated by the first WD 2a transmitting information AVAIL_RAT_SET {Bluetooth, WLAN, R} relating to which type of second communications link that the first WD 2a may establish. The second WD 2b responds by transmitting information AVAIL_RAT_SET {WLAN} relating to which type of second communications link that the first WD 2a may establish. The first WD 2a may upon reception of this information from the second WD 2b evaluate the response.

According to one embodiment, each one of the wireless transmission capabilities is associated with a level of priority from at least one set of priority levels. There could be many relations and orderings between the different transmission capabilities; for example, if desired transmission rate has highest priority then WLAN could be used, if line-of-sight has highest priority then IR could be used, etc. For example the at least one set of priority levels may relate to a geographical distance between the first WD 2a and the second WD 2b, a desired transmission rate for communications over the second communications link, a desired power of the transmission over the second communications link, or a desired encryption for communications over the second communications link. Thus, this embodiment may be readily combined with embodiments providing information regarding the geographical relation between the first WD 2a and the second WD 2b since such information could be used during determination of which type of second communications link to prioritize.

One of the wireless transmission capabilities common for the first WD 2a and the second WD 2b (in the present illustrative example WLAN) is then selected. The first WD 2a and the second WD 2b may then enable the second communications interface 11. In terms of positional information, the position information may be either explicitly defined (in terms of geographical location) or implicitly defined, such as from inference measurements from the surroundings of the first WD 2a and the second WD 2b.

According to an embodiment the geographical location is explicitly determined from GPS coordinates obtained from a GPS unit 12. Thus, in step S20 the first WD 2a may receive the geographical location of the second WD 2b as a set of global positioning system coordinates from the second WD 2b.

According to an alternative embodiment the geographical location is implicitly determined, in a step S22, from at least one of a cellular, or mobile, network attribute, a WLAN attribute or a Bluetooth attribute. For example, by enabling their WLAN interfaces 11a, the first WD 2a and the second WD 2b may be able to scan for surrounding access points and devices. This result may then be used as an indication of the relative positions of the first WD 2a and the second WD 2b. Thus, in case the geographical location is implicitly determined the wireless device 2 does not need to be equipped with a GPS unit 12. However, although the geographical location is implicitly determined from a network attribute, the wireless device 2 may still utilize a GPS unit 12 for additional and/or supplementary positional determination purposes.

In more detail, the first WD 2a and/or the second WD 2b may determine various network attributes to determine where the first WD 2a and/or the second WD 2b is/are located, inter alia from an operator name/ID, a cell ID, etc. Networks such as Long Term Evolution (LTE) compliant networks may provide further accuracy in terms of providing positioning information. For example, if provided with a WLAN interface, the first WD 2a and/or the second WD 2b may scan for WLAN access point SSIDs and/or Ethernet MAC addresses, thereby determining their position relative to a group of access points. For example, if provided with a Bluetooth interface, the first WD 2a and/or the second WD 2b may scan for surrounding Bluetooth devices, gathering their names and unique IDs (similar to WLAN). Additionally, the first WD 2a and the second WD 2b may also directly detect each other should both have their Bluetooth interface active.

For example, in the present illustrative example, upon receiving information from the second WD 2b that the second WD 2b is capable of WLAN transmission, the first WD 2a may thus enable its own WLAN interface and perform a scan for available access points. In FIG. 6 this is illustrated by the first WD 2a transmitting information requesting the second WD 2b to provide information regarding access points. This request is received by the second WD 2b which may respond to the first WD 2a with its scanned WLAN access points $\{AP_2, AP_3, AP_4\}$. The first WD 2a may then compare the received set of access points with its own set of scanned access points $\{AP_1, AP_2, AP_3\}$. Further data may then be exchanged. Thus, in the present illustrative example both the first WD 2a and the second WD 2b are within range of an access point denoted "$AP_2$" and an access point denoted "$AP_3$". This could indicate that the first WD 2a and the second WD 2b are potentially in close proximity. However, as noted above, if it from the positional information has been determined that the first WD 2a and the second WD 2b are out of range from each other (in terms of establishing a second communications link there between) the process of scanning for WLAN access points and the exchange of information thereof needs not to be performed.

Since the first connection is assumed to be always available, the first connection provides a reliable means which the first WD 2a and the second WD 2b may use to exchange information for determining which type of direct communications to set up.

The first phase is thereby completed and the second phase (illustrated in FIG. 7), according to which the communications channel of the second communications link is estimated may then commence. The second communications link is first set up in parallel with the first communications link. As noted above, in a step S6 a third set of messages is exchanged between the first WD 2a and the second WD 2b. The third set of messages, which are exchanged on the second communications link, are exchanged for establishing the short range connection between the first WD 2a and the second WD 2b based on at least one of the conditions. The third set of messages is exchanged by the second communications interface 11 of the first WD 2a and the second WD 2b.

Further, the third set of messages may be exchanged as a result of the conditions having been determined to comply with a predetermined criterion. That is, according to embodiments, the third set of messages is not exchanged if the conditions do not comply with the predetermined criterion. One of the conditions may relate to wireless transmission capabilities of at least one of the first WD 2a and the second WD 2b. For example, the predetermined criteria may be fulfilled if and only if the first WD 2a and the second WD 2b have at least one wireless transmission capability in common. Additionally, as noted above, one of the conditions may relate to a geographical relation between the first WD 2a and the second WD 2b. The predetermined criteria may then, for example, be fulfilled if the first WD 2a and the second WD 2b are located at a distance from each other being smaller than a predetermined distance.

The second communications link may first need to be configured and its channel quality verified. One configuration mechanism may be for the first WD 2a to propose link-appropriate addresses for each end to assign to the communications interface associated with transmission on the second communications link. Link addresses may enable messages exchanged on the second communications link to be addressed. According to embodiments link addresses are therefore exchanged, in a step S10, with the second WD 2b via the network node (prior to step S6).

Additionally, encryption keys could also be exchanged between the first WD 2a and the second WD 2b to securely exchange messages over the second communications link. In a step S12 encryption keys may therefore be exchanged between the first WD 2a and the second WD 2b via the network node prior to exchanging messages on the second communications link. The encryption keys enable messages exchanged on the second communications link to be encrypted.

According to embodiments the second communications link is established only upon prior exchange of addressing information and/or encryption keys. Hence the embodiment relating to addressing may be readily combined with the embodiment relating to encryption. Whether addressing and/or encryption is to be used may depend on practical circumstances and/or what kind of second communications link that is to be established. For example, due to the small distance of a typical IrDA link, neither addressing nor encryption may be required. On the other hand, for a WLAN link both addressing and encryption may be required. Further data may then be exchanged.

According to one embodiment, once the new direct link has been configured, its channel quality is estimated. In a step S14 at least one first channel quality indication (CQI) of the second communications link may be acquired. The CQI may be acquired prior to establishing the short range connection. Acquiring at least one first CQI may be based on at least one probe signal which is transmitted, on the second communications link, from one of the first WD 2a and the second WD 2b and received by the other of the first WD 2a and the second WD 2b. The at least one probe signal may comprise pilot symbols known to both the first WD 2a and the second WD 2b. That is, a pair of unique probe messages may be used in each direction. The short range connection may be established only in case the first CQI is above a first predetermined quality threshold.

Figure 7:
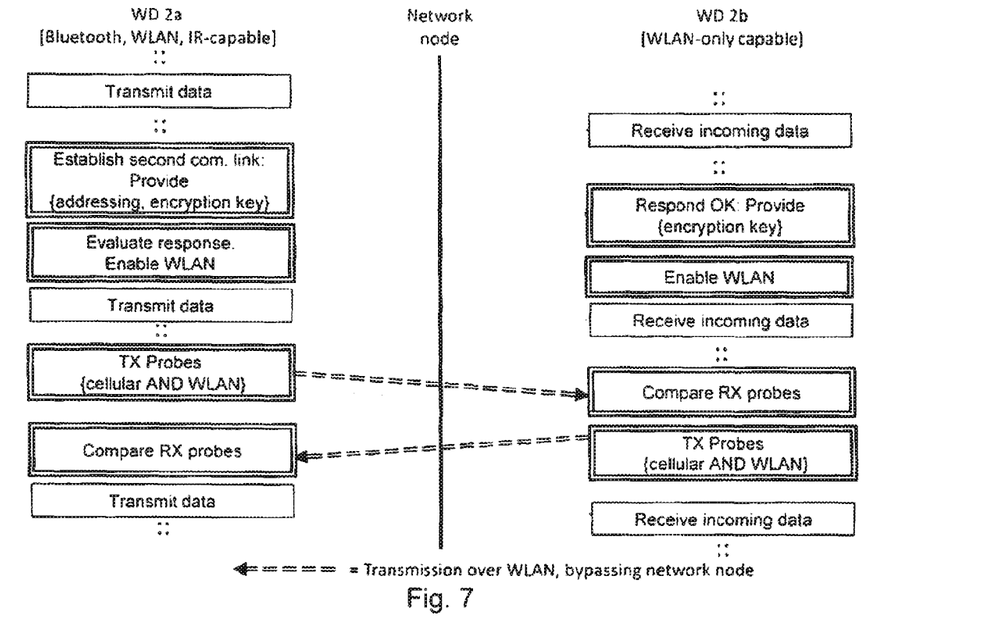
Figure 8:
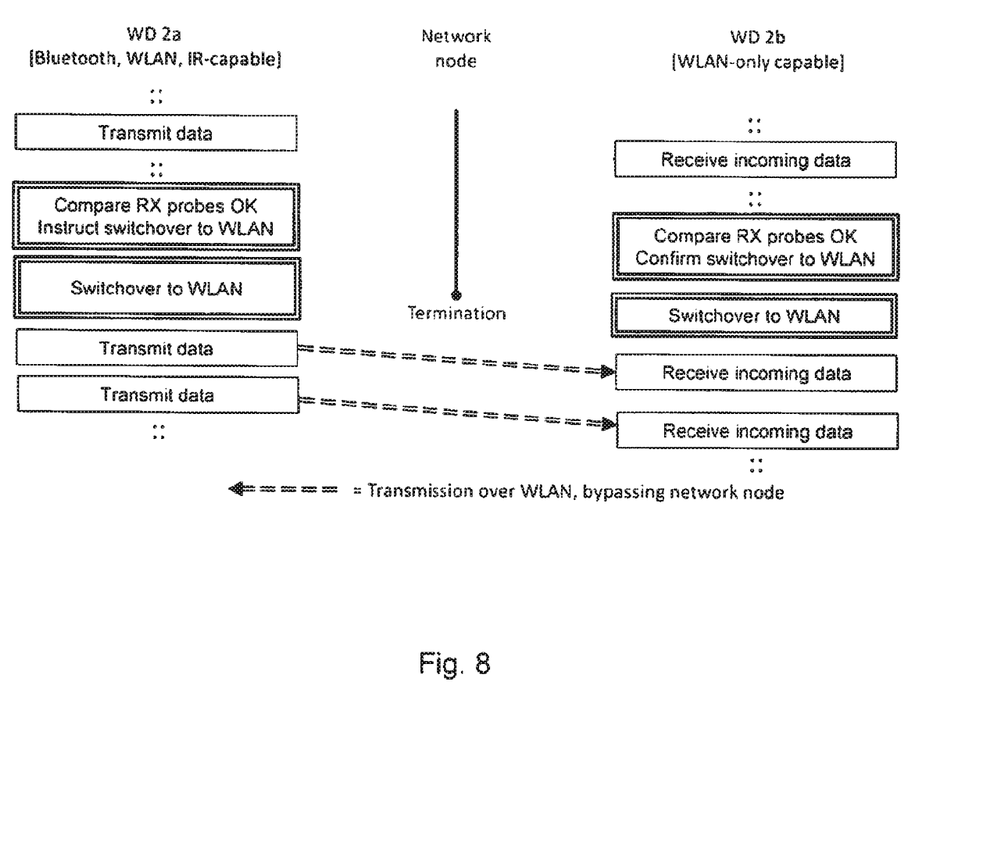

Additionally or alternatively, also at least one second channel quality indication, CQI, of the first communications link may be acquired, step S16. In FIG. 7 this is illustrated by the first WD 2a transmitting probes both over the first communications link and the second communications link. The probes are received by the second WD 2b which also may transmit its own probes to the first WD 2a both over the first communications link and the second communications link. Thereby the CQI of the second communications link may be compared to the CQI of the first communications link. That is, one set of probe messages (either in one direction or in both directions) may be exchanged via the existing (i.e., the first communications) path while one set of probe messages (either in one direction or in both directions) may be exchanged via the newly configured (i.e., the second communications) direct-link. A similar value of the CQI of the first communications link and the CQI of the second communications link may indicate a sufficient quality of the second communications link. That is, the first predetermined quality threshold may be dependent on the at least one second CQI. The embodiment of estimating channel quality is not dependent on whether or not addressing and/or encryption is performed. The embodiment of estimating channel quality may furthermore be readily combined with embodiments relating to priority levels of different types of available second communications links. The result of the channel quality estimation may be used as a parameter when determining which one of the available second communications links to prioritize; the at least one first channel quality indication may thus be acquired for all available second communications links.

If it is determined (either by the first WD 2a or the second WD 2b, for example by means of determining CQI) that the short range connection shall be established the data traffic may, in the third phase (illustrated in FIG. 8), be switched over from the first communications link to the second communications link. Data transmission, which was originally transmitted and received via the first communications interface 10 of the first WD 2a and the second WD 2b and occurring over the first communications link, may thus be re-configured to be transmitted and received via the second communications interface 11 of the first WD 2a and the second WD 2b and hence occur over the second communications link.

The exchange of the second set of messages for setting up the short range connection between the first WD 2a and the second WD 2b may be triggered by at least one trigger. One trigger may be a received (by either the first WD 2a or the second WD 2b) indication that the at least one second CQI (i.e. the channel quality of the first communications link) is below a second predetermined quality threshold. The second communications link may thus be established to provide an alternative to the first communications link. Another trigger may be that the amount of data to be exchanged between the first WD 2a and the second WD 2b is larger than a predetermined threshold. The second communications link may thus be established to add data resources. Another trigger may be the availability of the second communications link. Another trigger may be user input. Thus, exchanging the second set of messages may be triggered by reception of user input. Thereby a user of either the first WD 2a or the second WD 2b may determine that the second communications link shall be established. In order for a user to, via user input, be able to trigger the second set of messages information relating to available wireless transmission capabilities may be provided, in a step S18, to a user interface for user selection thereof.

When the short range connection has been successfully set up, the first communications link may be terminated. Thus, in a step S8, the first communications link may be terminated upon having established the short range connection. However, according to an embodiment the first communications link is maintained, thus providing two parallel communications links for the first WD 2a and the second WD 2b to exchange data. That is, depending on the performance or needs, the first communications link may or may not be terminated, thereby leaving only the short range second communications link present for communications between the first WD 2a and the second WD 2b. Hence, whether to maintain or to terminate the first communications link may depend on what triggered setting up the second communications link.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for short range communications in a wireless communications system between a first wireless device and a second wireless device, the method being performed in the first wireless device, comprising:
   exchanging a first set of messages with the second wireless device via a network node in the wireless communications system for establishing a first communications link with the second wireless device via the network node;
   acquiring a first channel quality indication (CQI) of the first communications link;
   exchanging a second set of messages with the second wireless device via the network node for evaluating conditions for setting up a short range connection between the first wireless device and the second wireless device on a second communications link, wherein exchanging said second set of messages is triggered by said at least one first CQI being below a first predetermined quality threshold; and
   exchanging a third set of messages with the second wireless device on the second communications link for establishing the short range connection with the second wireless device based on at least one of the conditions.

2. The method of claim 1, wherein the third set of messages are exchanged as a result of the conditions having been determined to comply with a predetermined criterion.

3. The method of claim 2, wherein the predetermined criterion is fulfilled if the first wireless device and the second wireless device have at least one wireless transmission capability in common.

4. The method of claim 2, wherein the predetermined criterion is fulfilled if the first wireless device and the second wireless device are located at a distance from each other being smaller than a predetermined distance.

5. The method of claim 1, wherein one of the conditions relates to wireless transmission capabilities of at least one of the first wireless device and the second wireless device.

6. The method of claim 5, wherein the wireless transmission capabilities comprise at least one of wireless local area network (WLAN) transmission, Bluetooth transmission, and infrared data association (IrDA)-based transmission.

7. The method of claim 5, wherein each one of the wireless transmission capabilities is associated with a level of priority from at least one set of priority levels.

8. The method of claim 7, wherein the at least one set of priority levels relate to one or more of a geographical distance between the first wireless device and the second wireless device, a desired transmission rate for communications over the second communications link, a desired power of the transmission over the second communications link, or a desired encryption for communications over the second communications link.

9. The method of claim 1, wherein one of the conditions relates to a geographical relation between the first wireless device and the second wireless device.

10. The method of claim 9, further comprising receiving the geographical location of the second wireless device as a set of global positioning system coordinates from the second wireless device.

11. The method of claim 9, further comprising determining the geographical relation from at least one of a cellular network attribute, a wireless local area network attribute, or a Bluetooth attribute.

12. The method of claim 1, further comprising terminating the first communications link upon having established the short range connection.

13. The method of claim 1, wherein the first communications link is a cellular radio link.

14. The method of claim 1, wherein the second communications link is one of a Wireless Local Area Network (WLAN) link, a Bluetooth link, and an Infrared Data Association (IrDA)-based communications link.

15. The method of claim 1, further comprising exchanging link addresses with the second wireless device via the network node prior to exchanging messages with the second wireless device on the second communications link, wherein said link addresses enables messages exchanged on the second communications link to be addressed.

16. The method of claim 1, further comprising exchanging encryption keys with the second wireless device via the network node prior to exchanging messages with the second wireless device on the second communications link, wherein said encryption keys enables messages exchanged on the second communications link to be encrypted.

17. The method of claim 1, further comprising acquiring at least one second channel quality indication (CQI) of the second communications link prior to establishing the short range connection with the second wireless device.

18. The method of claim 17, wherein acquiring the at least one second CQI is based on at least one probe signal which is transmitted, on the second communications link, from one of the first wireless device and the second wireless device and received by the other of the first wireless device and the second wireless device.

19. The method of claim 18, wherein the at least one probe signal comprises pilot symbols known to both the first wireless device and the second wireless device.

20. The method of claim 17, wherein the short range connection is established only in the event that said second CQI is above a second predetermined quality threshold.

21. The method of claim 20, wherein said second predetermined quality threshold is dependent on said at least one first CQI.

22. The method of claim 1, wherein exchanging said second set of messages is triggered by an amount of data to be transmitted from the first wireless device to the second wireless device being larger than a predetermined threshold.

23. The method of claim 1, wherein exchanging said second set of messages is triggered by reception of user input.

24. The method of claim 1, further comprising providing information relating to available wireless transmission capabilities to a user interface for user selection thereof.

25. The method of claim 1, wherein the network node is one of: a base station, a Node B, and an Evolved Node B.

26. A non-transitory computer-readable medium comprising, stored thereupon, a computer program for short range communications in a wireless communications system between a first wireless device and a second wireless device, the computer program comprising computer program code that, when run on the first wireless device, causes the first wireless device to:
   exchange a first set of messages with the second wireless device via a network node in the wireless communications system for establishing a first communications link with the second wireless device via the network node;
   acquire a first channel quality indication (CQI) of the first communications link;

exchange a second set of messages with the second wireless device via the network node for evaluating conditions for setting up a short range connection between the first wireless device and the second wireless device on a second communications link, wherein exchanging said second set of messages is triggered by said at least one first CQI being below a first predetermined quality threshold; and exchange a third set of messages with the second wireless device on the second communications link for establishing the short range connection with the second wireless device based on at least one of the conditions.

27. A first wireless device for short range communications in a wireless communications system between the first wireless device and a second wireless device, comprising:
   a first communications interface circuit;
   a second communications interface circuit;
   and a processing circuit operatively connected to the first and second communications interface circuits;
   wherein:
   the first communications interface circuit is configured to exchange a first set of messages with the second wireless device via a network node in the wireless communications system for establishing a first communications link with the second wireless device via the network node;
   the processing circuit is configured to acquire a first channel quality indication (CQI) of the first communications link;
   the first communications interface circuit further is configured to exchange a second set of messages with the second wireless device via the network node for evaluating conditions for setting up a short range connection between the first wireless device and the second wireless device on a second communications link, wherein exchanging said second set of messages is triggered by said at least one first CQI being below a first predetermined quality threshold; and
   the second communications interface circuit is configured to exchange a third set of messages with the second wireless device on the second communications link for establishing the short range connection with the second wireless device based on at least one of the conditions.

* * * * *